US007318101B2

(12) United States Patent
Droms

(10) Patent No.: US 7,318,101 B2
(45) Date of Patent: Jan. 8, 2008

(54) METHODS AND APPARATUS SUPPORTING CONFIGURATION IN A NETWORK

(75) Inventor: Ralph E. Droms, Westford, MA (US)

(73) Assignee: Cisco Technology, Inc., San Jose, CA (US)

(*) Notice: Subject to any disclaimer, the term of this patent is extended or adjusted under 35 U.S.C. 154(b) by 891 days.

(21) Appl. No.: 10/720,643

(22) Filed: Nov. 24, 2003

(65) Prior Publication Data

US 2005/0114515 A1 May 26, 2005

(51) Int. Cl.
G06F 15/16 (2006.01)
G06F 15/177 (2006.01)

(52) U.S. Cl. .................. 709/229; 709/220; 709/221; 709/249; 707/9

(58) Field of Classification Search ........ 709/220–222, 709/225–229, 249; 707/9–10; 370/400–401, 370/254
See application file for complete search history.

(56) References Cited

U.S. PATENT DOCUMENTS

| 6,640,278 B1* | 10/2003 | Nolan et al. ............ 707/10 |
| 6,751,670 B1* | 6/2004 | Patterson ............... 709/229 |
| 7,131,141 B1* | 10/2006 | Blewett et al. .......... 709/229 |
| 7,167,920 B2* | 1/2007 | Traversat et al. ......... 707/9 |
| 2003/0005112 A1* | 1/2003 | Krautkremer ............ 709/225 |
| 2003/0058874 A1 | 3/2003 | Sahaya et al. ........... 370/401 |
| 2003/0165121 A1 | 9/2003 | Leung et al. ............ 370/313 |
| 2004/0022258 A1* | 2/2004 | Tsukada et al. .......... 370/401 |

FOREIGN PATENT DOCUMENTS

WO  WO 02/19656 A1  3/2002

OTHER PUBLICATIONS

International Search Report from PCT/US2004/033729 filed Oct. 13, 2004, Total pp. 4.

* cited by examiner

Primary Examiner—Bharat Barot
(74) Attorney, Agent, or Firm—BainwoodHuang

(57) ABSTRACT

A configuration server maintains configuration information associated with a given host computer. Thus, the configuration information is maintained at a remote location with respect to the given host computer. During operation, the configuration server may receive a signal to modify the configuration information associated with the given host computer. In response to modifying the configuration information, the configuration server generates a command to terminate a communication link through which the given host computer communicates to access the network. Termination of the communication link prompts the given host computer to initiate further communications to enable the given host computer to again access the network based on use of the modified configuration information. For example, termination of the communication link may cause the given host computer to retrieve configuration information such as a new IP address to access the network.

41 Claims, 9 Drawing Sheets

METHODS AND APPARATUS SUPPORTING CONFIGURATION IN A NETWORK

BACKGROUND OF THE INVENTION

The Dynamic Host Configuration Protocol (DHCP) is specifically defined in Request For Comment 2131 (a.k.a., RFC 2131) and enables host clients on an IP (Internet Protocol) network to request and obtain configuration information from a DHCP configuration server. Perhaps the most significant configuration option supported by the DHCP protocol is the dynamic allocation of IP addresses to clients. This option affords flexibility to network users, reduces the overall maintenance associated with manually administering an IP network, and supports reusability of network addresses. Thus, DHCP is particularly well-suited for use in connection with laptop computers that are used in several different networks, and use in large networks in which keeping track of a large number of IP addresses would otherwise be difficult.

There are two primary features of DHCP. First, DHCP defines mechanisms through which clients can be assigned an IP address for a finite lease period, allowing for reassignment of the IP address to another client later after the lease has expired. Second, DHCP provides the mechanism for a client to gather other IP configuration parameters it needs to operate in a TCP/IP (Transmission Control Protocol/Internet Protocol) network.

The three techniques supported by the DHCP protocol to assign IP addresses to clients include "automatic allocation" in which a DHCP server assigns a permanent IP address to a client, "manual allocation" in which a client's IP address is manually chosen by a network administrator and the DHCP server conveys the IP address to the client, and "dynamic allocation" in which a DHCP server assigns an IP address to the client for a limited period of time (e.g., a lease period).

In a typical session, the client sends a DHCPDISCOVER message to obtain an IP address from a server. The client optionally includes an IP address in the message that it would like to be assigned. The server responds with a DHCPOFFER message that includes the IP address to be assigned to the client and other parameters such as a netmask.

After the client receives the DHCPOFFER message from the configuration server, the client responds with a DHCPREQUEST message that includes a "server identifier" value. Inclusion of the server identifier value indicates to the configuration server that the client has accepted its offer. The message also indicates to other servers that the requesting client has declined their offers. The selected server receives the DHCPREQUEST message and then responds with a DHCPACK message including appropriate configuration parameters. If the server has already allocated the IP address requested by the client, the server will send a DHCPNAK instead of a DHCPACK to the client. A client may perform a check routine to verify that the IP address is correct by implementing ARP (Address Resolution Protocol) on a local network segment.

If the client detects that the address is already in use on the local network segment, the client sends a DHCPDECLINE message to the server and initiates the request process again. If the client receives a DHCPNAK (e.g., no acknowledgment) from the DHCP server after sending the DHCPREQUEST, the client will also send a request again.

After being assigned a lease for an IP address, if the client no longer needs an IP address, the client may send a DHCPRELEASE message to the DHCP server indicating that the IP address is no longer needed. Alternatively, a client may extend a lease time of an IP address by generating an appropriate request.

Most computer devices perform a routine exploiting the DHCP protocol discussed above at power-up to automatically retrieve an IP address and connect themselves to a network. For example, a computer device that must lease or be dynamically assigned an IP address may exploit a routine at power-up to automatically enable appropriate network interfaces and thereafter retrieve an IP address from a DHCP server for connecting and communicating over a corresponding network to which the computer device is attached. Thus, in such instances, a user need not manually request assignment of an IP address to connect to a network because the computer device is programmed to automatically perform such a routine at power-up.

SUMMARY

Conventional deployment of the DHCP protocol (and dynamic assignment of IP address in general) suffers from certain deficiencies. One such deficiency is that conventional techniques do not support on-demand reassignment of a new IP address without manual intervention by a computer user. For example, a computer user must either reset power on the computer to renew its presently assigned IP address, manually execute a command to initiate an update of a presently assigned IP address, or wait for a lease to expire to be assigned another IP address. Thus, if it is necessary to immediately (e.g., without waiting for a lease to expire) update the host computer's assigned IP address at some time after power-up, the user must either endure non-use of the computer while it is powering down/up again or learn how to execute an appropriate software CLI (Command Line Interface) command to modify an existing IP address without powering down the computer. In either case, it is an inconvenience to the computer user.

One solution to alleviate the computer user from having to perform a manual operation to update a computer's IP address is to reduce a lease time associated with an IP address assigned to the computer device. Upon expiration of a shortened lease, a configuration server communicating with the host computer may automatically assign a new IP address to the computer device without performance of a manual operation on the part of the computer user. A drawback of shortening a lease period is increased network traffic which is generated because the configuration server must more frequently communicate with the computer device to determine whether a present lease of an IP address shall be renewed or replaced with a new IP address. Also, as mentioned, a computer device may have to wait at least a minimal amount of time for a present lease to expire before being assigned a new IP address.

Another solution to alleviate the computer user from having to perform a manual operation to update a computer's IP address is to use the DHCPFORCERENEW command which was added to the DHCP protocol and is described in RFC3203. This new command is issued by a configuration server to the host computer and causes the computer device to contact the configuration server and automatically update its presently assigned IP address. This new command has several drawbacks. First, present operating systems do not support such a command because it was only recently added to the DHCP protocol. Second, even if operating systems were modified to support the DHCP-FORCERENEW command, the implementation of the command would have to be secure enough to prevent malicious hackers from attacking computer devices that support it.

It is an advancement in the art to provide a technique that would alleviate a subscriber at a host computer from having to manually perform an operation to be reassigned a new network address. Additionally, it is an advancement in the art to support automatic reassignment of IP addresses without having to modify computer operating systems currently used in the field. Thus, embodiments of the invention are directed towards facilitating the reassignment of a new IP address with minimal intervention by a computer user. For example, in contrast to the above-described conventional approaches to directing a host computer to obtain a new IP address, an embodiment of the present invention is directed to techniques for controlling IP address loading by the host computer from a remote device. In particular, the remote device (e.g., a configuration server) breaks a link (e.g., a logical relationship at the L2 layer established between the host computer and adjacent ISP equipment) which causes the host computer to automatically perform a new DHCP round of handshaking with a DHCP server to obtain a new IP address. Accordingly, such operation provides a well suited means for changing ISP subscriptions that rely in a change of IP addresses. Moreover, such operation alleviates the need for rebooting the host computer as well as the need to manually enter commands on a command line interface of the host computer which most user would not know how to use.

Thus, in a specific embodiment of the invention, a host computer is initially assigned (e.g., during power-up) an IP address for accessing a network based on a corresponding first network service (e.g., a service provider or service plan) assigned for use by the host computer to access the network. Using this initially assigned IP address, a subscriber at the host computer is able to access (e.g., via an edge device) web pages distributed by web servers over the network. A web page may include available network service options (e.g., different service providers or types of network service plans) that the subscriber may select for supporting future access to the network via the subscriber's host computer.

Upon selection of a new network service by the subscriber, the host computer may be automatically assigned a new IP address that supports connectivity to the network via the newly selected network service plan. For example, via use of the web page including available network service options, the subscriber at the host computer may select a second network service on which to access the network (such as the Internet) instead of the first network service. In response to a subscriber's selection of the second network service by clicking on an appropriate network service, the web server detecting the selection and providing the network service options web page may, in turn, generate a signal to a configuration server to update an entry of a map tracking an identity of the host computer and a corresponding network service that the host computer is assigned to access the network.

To facilitate reassignment of a new network address (such that the host computer may access the network via the second network service), the configuration server sends a command to terminate a link (e.g., to deny the subscriber and host computer access to the network) through which the host computer previously accessed the network via the first network service. In response to receiving the command, a network device providing the link terminates the link to deny network access by he host computer. The host computer may detect termination of the link and, again, automatically execute a routine (such as the INIT-REBOOT process typically employed at power-up) to request and retrieve an IP address from the configuration server. This enables the host computer to be reassigned an new IP address to access the network via the second network service.

As mentioned, because the host computer is programmed to automatically perform the request for an IP address when the initial link is terminated, the subscriber need not perform any manual operations to initiate reassignment of a new IP address. Nor does the user of the host computer need to reboot in order to be assigned a new network address. Instead, the host computer automatically initiates communication with the configuration server in response to detecting a termination of the previous link. Since the configuration server includes an updated mapping associating the host computer to the second network service, the configuration server sends the host computer an IP address that enables access to the network via the second network service instead of the first network service. In this manner, a subscriber at the host computer is automatically reassigned a new IP address for access the network.

Accordingly, in view of the specific embodiment discussed above, a general embodiment of the invention involves a technique of supporting reconfiguration of a host computer used to access a network. A configuration server maintains configuration information associated with a given host computer. During operation, the configuration server may receive a signal to modify the configuration information associated with the given host computer. In response to modifying the configuration information, the configuration server generates a command to terminate a present communication link through which the given host computer communicates to access the network. Termination of the communication link prompts the given host computer to initiate further communications to enable the given host computer to again access the network based on use of the modified configuration information. For example, termination of the communication link may cause the given host computer to retrieve configuration information such as a new IP address to access the network.

Another general embodiment of the invention involves a technique of supporting reconfiguration of a host computer that is utilized to access a network. In the context of a client-server application, a server (e.g., a configuration server) maintains a mapping between a given host computer (e.g., a client) and a corresponding first network service that the given host computer is assigned for accessing the network. The server receives a signal to modify the mapping so that the given host computer is assigned a second network service for accessing the network instead of the first network service. In response to receiving the signal, the server generates a command to deny the given host computer from accessing the network which, in turn, results in the given host computer initiating communications to enable the given host computer to access the network via the second network service based on the modified mapping. Thus, the given host computer may be automatically reconfigured (e.g., in response to the link termination) without having to endure non-use of the computer while it is powering down/up again or requiring a user of the given computer to figure out how to execute an appropriate software command to reconnect the given computer to the network.

In further embodiments and yet other independent embodiments of the invention, generating the command to deny the given host computer from accessing the network includes providing the command to at least temporarily disconnect a physical link or terminate an electronic signal (e.g., a carrier signal, an acknowledgment signal, a reply signal, etc.) otherwise transmitted to maintain a communication link supporting communications from the given host computer to the first network service. Termination of the link denies the given host computer access to the network. Denial of network access prompts the given host computer to initiate a routine to re-establish a communication link to access the network via the second network service according to the modified mapping.

In one embodiment, the given host computer initially communicates over the network via the first network service via use of a first network address and denial of network access (or terminating the link) prompts the given computer to be reassigned a second network address to access the network via a second network service. Thus, prior to modifying the mapping, the server disseminates a first network address to the given host computer to support access to the network via the first network service. After modifying the mapping, the server disseminates a second network address to the given host computer to support access to the network via the second network service. In one embodiment, denial of network access prompts the given host computer to request reassignment of a network address for use by the given host computer to provide access to the network. As discussed above, a configuration server may provide the first and second network address according to the DHCP protocol.

In one embodiment, reception of the signal to modify the mapping includes receiving a selection message identifying that a subscriber at the given host computer selects a second network service on which to support future communications instead of the first network service. For example, a subscriber at the given host computer may select the second network service based on accessing a web page including network service options from a website via use of the first network service.

Selection of the one of multiple available network services via listed in the web page prompts the web server supporting the web page to transmit a signal to the configuration server to modify the mapping to associate the given host computer with the second network service instead of the first network service. In response, the configuration server updates a mapping associating host computers to corresponding selected network services on which to access the network. In the present example, the subscriber at the given host computer selects the second network service for accessing the network instead of the first network service used to access the web page including network service options.

After the server updates the mapping, there is an instant in time in which the given host computer may be accessing the network service via the first network service even though the subscriber has just selected a second network service on which to access the network. To support a switchover to the second network service, the configuration server transmits a command to deny network access (to the given host computer) by transmitting a command to a network device disposed between the given host computer and the network being accessed. The network device may include a link to the given host computer that is established according to a connection-oriented protocol. For example, the given host computer may be coupled to the network via a network device based on a TCP/IP (Transmission Control Protocol/Internet Protocol) protocol linking the given host computer to the first network service. Upon receipt of the command at the network device to terminate access, the network device terminates communication on the link such that the given host computer no longer detects that it is coupled to the network device. In one embodiment, the network device terminates the link at a link layer of the connection-oriented protocol (e.g., TCP/IP) in response to receiving the command.

In response to detecting termination of the communication link, the given host computer initiates a routine to re-establish a link with the network device to access the network via the second network service according to the modified mapping. For example, the routine to re-establish a link may involve the given computer generating a DHCP request message to obtain another valid IP address with which to communicate over the network via an appropriate network service. In the present example, the configuration server reassigns the given host computer an IP address enabling access to the network via the second network service instead of the first network service.

Another general embodiment of the invention involves a technique of supporting reconfiguration of a given host computer via a network device that couples the given host computer to a network. For example, the network device (e.g., a network edge device that supports coupling one or more computers to a network via appropriate network services) supports communications from the given host computer to the configuration server in order to retrieve configuration information that, in turn, enables the given host computer to access the network via a first network service. As discussed, the network device receives a command to deny the given host computer access to the network. After denying the given host computer access to the network, the network device supports further communications associated with the given host computer to retrieve reconfiguration information (e.g., a new IP address) that enables the given host computer to access the network via a second network service.

More specifically, in one embodiment, the network device maintains a map indicating on which of multiple network services to forward network messages from the given host computer over the network depending on a network address identifying an origin of the network messages. Prior to receiving the command to deny network access, a configuration server initially assigns the given host computer a first network address (e.g., an IP address identifying the given host computer as an originator) and the network device forwards network messages received from the given host computer over a corresponding first network service. As discussed, a subscriber may select a different network service in which to access the network. In response to the new selection and updating a mapping, the configuration server sends the command to the network device to deny network access. The command may indicate to terminate the link such that the given host computer no longer detects that it is coupled to the network device. After receiving the command at the network device and denying network access, the given host computer initiates a routine of re-establishing a new link to access the network in which the configuration server assigns the given host computer a second network address (e.g., another IP address identifying the given host computer as an originator). Based on the new address (e.g., second network address), the network device forwards network messages received from the given host computer over a corresponding second network service. In other words, the network device forwards messages to appropriate network service providers depending on the IP address assigned to the host computers.

Embodiments of the invention may be employed such that a network system and portions thereof support a unique method of configuring host computers to communicate over a network. Use of the aforementioned and following techniques are particularly well-suited for use in network systems that support disseminating configuration information to the given host computer according to DHCP (Dynamic Host Control Protocol) and, more specifically, those that support disseminating network addresses (e.g., IP addresses) for use by host computers that access a network via one of multiple network services as indicated by a configuration mapping in a configuration server.

Other embodiments of the invention include a computer system, such as a data communications device, computerized device, or other device configured with software and/or circuitry to process and perform all (or a portion thereof) of the method operations noted above and disclosed herein as embodiments of the invention. In such embodiments, the device, such as a data communications device, comprises one or more communications interfaces (e.g., network interfaces), a memory (e.g., any type of computer readable medium, storage or memory system), a processor and an interconnect mechanism connecting the communications interface, the processor and the memory. In such embodiments, the memory system is encoded with an application that causes the computer system to perform any part and/or all of the method embodiments, steps and operations explained herein as embodiments of the invention. In other words, a computer, switch, router, hub, bridge, edge device, configuration server, or other communication or data serving device that is programmed or otherwise configured to operate as explained herein is considered an embodiment of the invention.

One embodiment of the present invention is directed to a computer program product that includes a computer readable medium having instructions stored thereon for configuring a network node to support routing of network messages. The instructions, when carried out by a processor of the data communication device, cause the processor to perform the steps of: i) maintaining a mapping between a given host computer and a corresponding first network service that the given host computer is assigned for accessing the network; ii) receiving a signal to modify the mapping so that the given host computer is assigned a second network service for accessing the network instead of the first network service; and iii) in response to receiving the signal, generating a command to deny the given host computer from accessing the network which, in turn, results in the given host computer initiating communications to enable the given host computer to access the network via the second network service based on the modified mapping. Other arrangements of embodiments of the invention that are disclosed herein include software programs to perform any of the method embodiment steps and operations summarized above and disclosed in detail below.

Embodiments of the invention may be implemented by computer software and/or hardware mechanisms within any type of computing apparatus. It is to be understood that the certain embodiments of the invention can be embodied strictly as a software program, as software and hardware, or as hardware and/or circuitry alone such in a content engine coupled to a network. The features of the invention, as explained herein, may be employed in data communications devices, computerized devices and/or software systems for such devices such as those manufactured by Cisco Systems, Inc. of San Jose, Calif.

Figure 1:
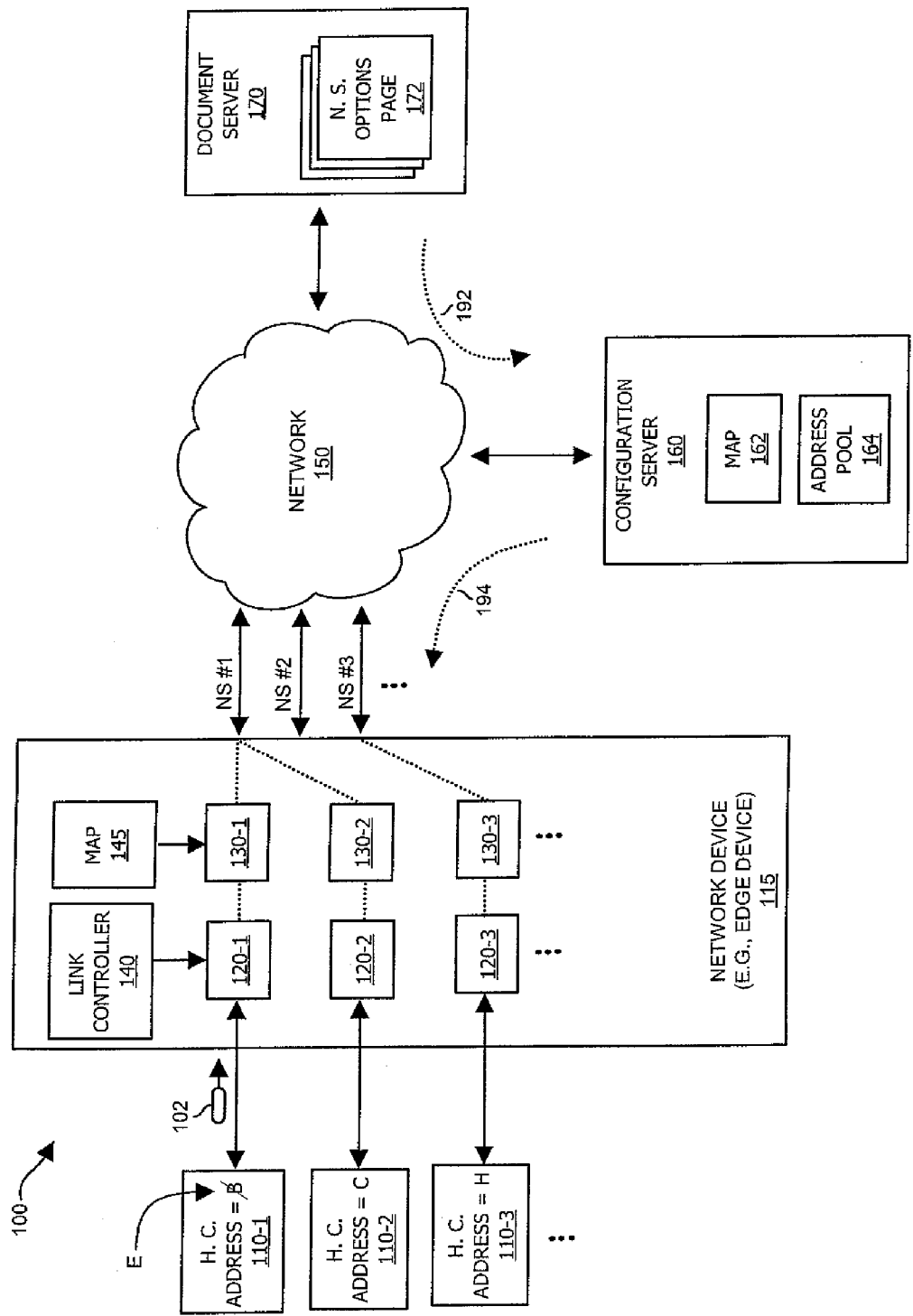
FIG. 1 is a system block diagram of a communication system supporting reconfiguration of a host computer according to an embodiment of the invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF EMBODIMENTS

An embodiment of the present invention is directed to techniques for controlling IP address loading by the host computer from a remote device. In particular, the remote device (e.g., a configuration server) breaks a link (e.g., a logical relationship at an L2 layer established between the host computer and adjacent ISP equipment) supported by a network edge device which causes the host computer to automatically perform a new DHCP round of handshaking with a DHCP server to obtain a new IP address. Accordingly, such operation provides a well suited means for changing ISP subscriptions that rely on a change from one IP address to another. Moreover, such operation alleviates the need for rebooting the host computer as well as the need to manually enter commands on a command line interface of the host computer which most computer users do not know how to use.

Accordingly, an embodiment of the invention enables a host computer to initially access a network via use of a first IP address assigned during a power-up phase when a computer is first turned on. For example, based on use of the first IP address, a subscriber at the host computer is capable of accessing information such as web pages distributed by web servers over the network via use of a first network service. In one application, the subscriber accesses a web page and selects a new network service to access web pages over the network. Upon selection of the new network service, the host computer is assigned a new IP address that supports connectivity to the network via the newly selected network service. For example, in response to a subscriber's selection of the second network service to access the network, the web server detecting the selection generates a signal to a configuration server to update an entry of a map that tracks an identity of the host computer and a corresponding network service that the host computer is assigned to access the network. To facilitate reassignment of a new network address (such that the host computer may access the network via the second network service), the configuration server sends a command to terminate a link to deny the subscriber and host computer access to the network. In response to denying access to the network via the first network service, the host computer assumes the link is not usable and thus requests another IP address from the configuration server to access the network. Since the configuration server includes an updated mapping associating the host computer to the second network service as requested, the configuration server sends the host computer an IP address that enables access to the network via the second network service instead of the first network service. In this manner, a subscriber at the host computer is assigned a new IP address for accessing the network.

FIG. 1 is a block diagram of communication system 100 according to an embodiment of the invention. As shown, communication system 100 includes host computers 110-1, 110-2, 110-3, . . . (collectively, host computers 110), network device 115 (e.g., an edge device), network 150, document server 170, and configuration server 160. Network device 115 includes link controller 140, links 120-1, 120-2, 120-3, . . . , (collectively, links 120) map 145, and message forwarding module 130-1, 130-2, 130-3, . . . , (collectively, message forwarding modules 130). Document server 170 generates and serves network service options page 172. Configuration server 160 includes map 162, and address pool 164.

In general, communication system 100 enables host computers 110 to access configuration server 160 and obtain network addresses supporting communication over network 150 (e.g., a communication network supporting transmission of TCP/IP data packets). In one application, network addresses are IP addresses assigned to host computers 110 by configuration server 160 according to the DHCP protocol.

As shown, host computer 110-1 transmits message 102 (e.g., one or more data packets formatted according to TCP/IP) to network device 115. Link 120-1 conveys message 102 to message forwarding module 130-1 that, in turn, forwards message to network 150 via one of multiple network services (e.g., NS #1, NS #2, NS #3, etc.). Network services may include one or multiple service plans provided by each of different ISPs or different service plans available from the same ISP.

Link controller 140 (in network device 115) receives commands 194 from configuration server 160 to terminate selected links 120 and thus deny a corresponding host computer 110 access to network 150. Denial of network access may be achieved in a number of ways depending on a type of link 120 coupling a corresponding host computer 110 to network 150. For example, in one embodiment, link 120-1 is configured as a hard-wired link such as one or multiple pairs of twisted wires physically coupling host computer 110-1 to network device 115 via link 120-1. Upon receipt of command 194 from configuration server 160 to deny network 150 access, link controller 140 physically disconnects link 120-1 via a mechanical or electrical switch at network device 115 such that host computer 110-1 is physically "unplugged" from network device 115. Thus, connectivity between the host computer 110-1 and network device 115 (and ultimately network 150) is controlled, not at the host computer 110-1, but instead at the network device 115. Host computer 110-1 detects the "unplugged" condition and may initiate a routine (e.g., INIT-REBOOT) to obtain another network address (e.g., network address E) for accessing network 150. This will be discussed in more detail later in the specification.

In another embodiment, link 120-1 (as well as any other links 120) is configured to support wireless communications. In such an embodiment, host computer 110-1 communicates with network device 115 via a wireless link. In response to receiving command 194 to deny network 150 access, link controller 140 terminates wireless communications (potentially including transmission of a carrier frequency on which data is transmitted) from network device 115 to host computer 110-1. Host computer 110-1 detects the "non-responsive" condition of network device 115 and may initiate a routine (e.g., INIT-REBOOT) to obtain another network address (e.g., network address E) for accessing network 150.

In yet another embodiment, link 120-1 (as well as the other links 120) is configured to support communications via a modem. In such an application, host computer 110-1 communicates with network device 115 on a channel designated to carry communications between the host computer 110-1 and network device 115. In response to receiving command 194 to deny network access, link controller 140 terminates transmission of information on the channel from network device 115 to host computer 110-1. Host computer 110-1 detects the "non-receipt" of the channel and may initiate a routine (e.g., INIT-REBOOT) to obtain another network address (e.g., network address E) for accessing network 150.

Map 145 (in network device 115) includes a listing of network addresses and corresponding network services upon which messages are to be forwarded. Thus, message forwarding module 130-1 forwards message 102 (including a corresponding network address) along to network 150 via NS #1 depending on a corresponding network address in message 102 identifying host computer 110-1 as the originator. In a similar way, message forwarding modules 130 forward messages from host computers 110 to network 150 via appropriate network services as identified by map 145.

Document server 170 serves documents such as network service options page 172 to host computers 110 upon request. Network service options page 172 may include a listing of network services available for selection by to a subscriber at a corresponding host computer 110.

Configuration server 160 includes map 162 and address pool 164. Map 162 tracks which network service (e.g., NS #1, NS #2, NS #3, . . . ) may be assigned for use by a given host computer 110 to access network 150 address pool 164 which includes network addresses assigned to host computers 110 for accessing network 150. Address pool 164 includes network addresses that may be assigned to host computers 110 for accessing network 150 via an appropriate network service.

Figure 2:
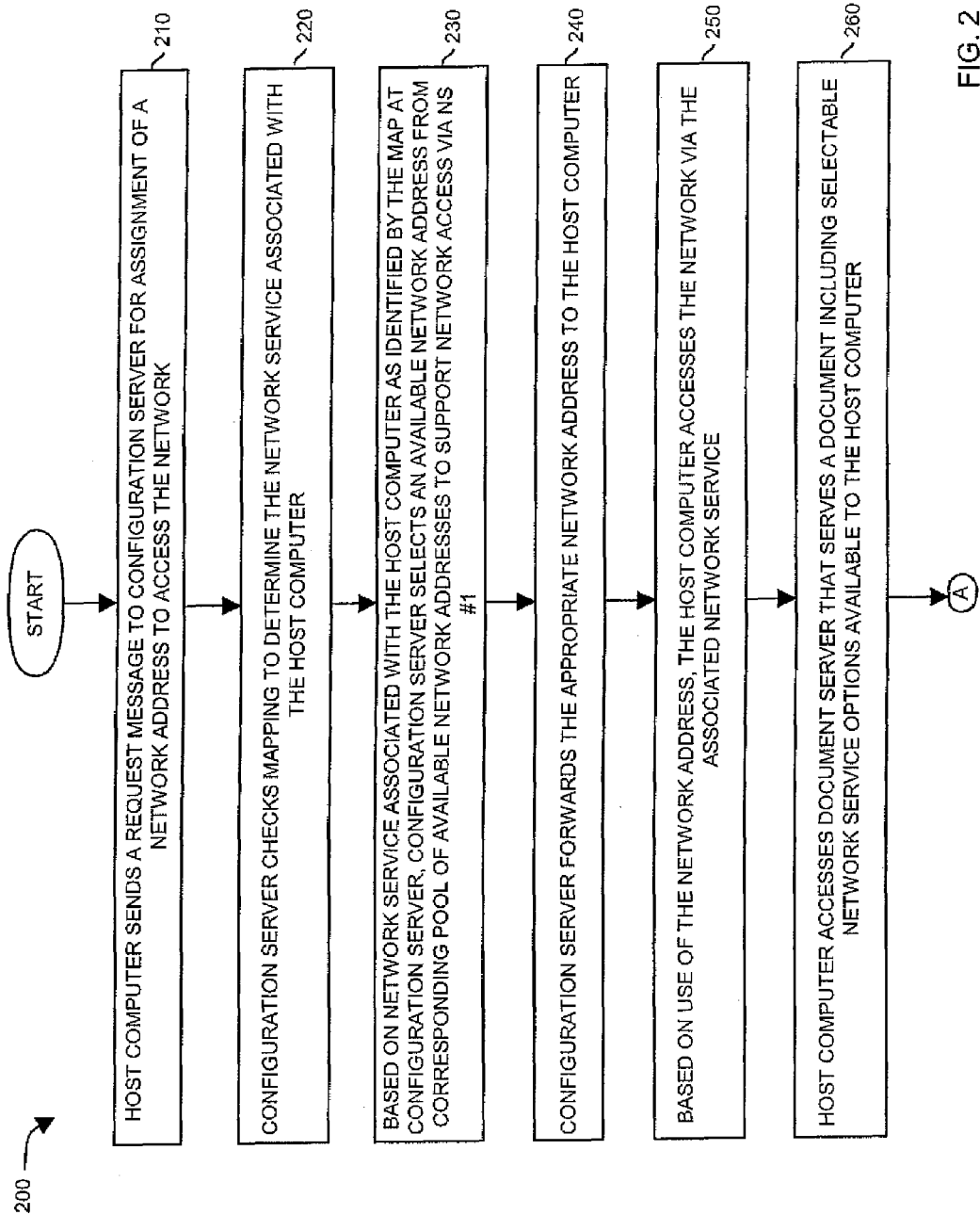
FIGS. 2 and 3 combine to form a flowchart describing functionality the communication system in FIG. 1 according to an embodiment of the invention.
Figure 3:
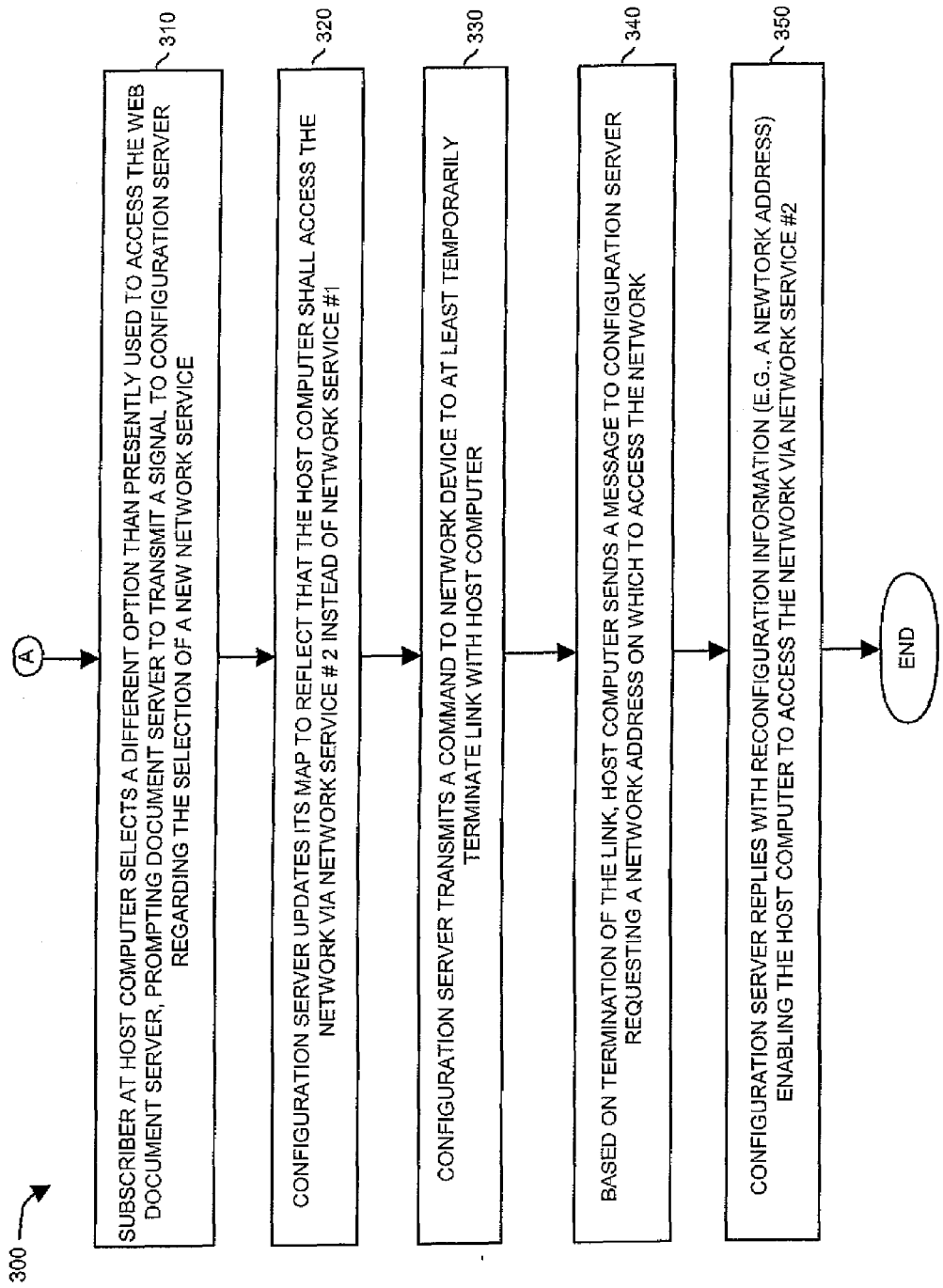

FIGS. 2 and 3 combine to form a flowchart 200 and flowchart 300 illustrating functionality of communication system 100 in FIG. 1 according to an embodiment of the invention.

Referring to FIG. 2, in step 210, host computer 110-1 sends a request message 102 (e.g., based on use of the DHCP protocol) to configuration server 160 for assignment of a network address with which to access information such as web pages over network 150.

In step 220, the configuration server 160 checks a map 162 to determine a network service (e.g., network service

1, network service #2, network service #3, etc.) associated with the host computer 110-1 that it is assigned for accessing network 150.

In step 230, the configuration server 160 selects an available network address from address pool 164. The network address selected by the configuration server 160 will enable host computer 110-1 to access network 150 via network service #1 (NS #1).

In step 240, the configuration server 160 forwards network address B to be its origin address and enable host computer 110-1 to communicate with network 150 via NS #1. For example, assignment of a network address enables host computer 110-1 to both transmit and receive messages.

In step 250, host computer 110-1 accesses network 150 via use of network address B. Map 145 indicates that messages having a network address falling in a range A-D (e.g., A, B, C and D) are transmitted to network 150 via network service #1. Thus, messages from host computer 110-1 are forwarded via message forwarding module 130-1 (e.g., a multiplexer or routing function) to network 150 via network service #1.

In step 260, host computer 110-1 accesses document server 170 and retrieves a network service options page 172 including selectable network services. Network service options page 172 includes selectable network services such as NS #1, NS #2, NS#3, etc.

Referring now to FIG. 3, in step 310, the subscriber (e.g., a user) at host computer 110-1 selects a different option than presently used NS #1 to access pages from document server 170. In response to the subscriber at host computer 110-1 selecting, for example, network service #2, document server 170 transmits a signal 192 (e.g., a network message) to configuration server 160 regarding the selection by host computer 110-1 of a new service.

In step 320, configuration server 160 updates map 162 to reflect that host computer is assigned to access the network 150 via network service #2 instead of previously used network service #1.

In step 330, configuration server 160 transmits a command 194 to network device 115 to at least temporarily terminate or disable link 120-1 to deny host computer 110-1 access to network 150. For example, based on receipt of command 194 at network device 115, link controller 140 disables link 120-1.

In step 340, termination or disabling of link 120-1 causes host computer 110-1 to initiate a routine to establish a communications with network device 115 again. For example, host computer 110-1 sends a message to configuration server 160 requesting another network address on which to access network 150.

In step 350, based on reviewing map 162, configuration server 160 replies with reconfiguration information (e.g., a second network address) enabling host computer 110-1 to access network 150 via network service #2. For example, configuration server 160 sends host computer network address E to be used instead of previously sent network address B. Thereafter, host computer 110-1 uses address E as an origin address and message forwarding module 130-1 forwards messages from host computer 110-1 to network 150 on network service #2.

Thus, based on the aforementioned method, configuration server 160 initially assigns (e.g., during power-up) an IP address B to host computer 110-1 based on a corresponding network service #1 (e.g., a service provider or service plan) assigned for use by the host computer 110-1 to access the network 150. Using this initially assigned IP address B, a subscriber at the host computer 110-1 accesses network service options page 172 distributed by document server 170 over the network 150. Network service options page 172 includes available network service options (e.g., different service providers or types of network service plans) that the subscriber may select for supporting future access to the network 150 via host computer 110-1.

Upon selection of a new network service (e.g., NS #2) by a subscriber, the host computer 110-1 is automatically assigned a new IP address E that supports connectivity to the network 150 via the newly selected network service #2. For example, via use of a web page including available network service options, the subscriber at the host computer 110-1 selects a second network service (e.g., NS #2) on which to access the network 150 (such as the Internet) instead of the first network service (NS #1) as initially used to access network 150. In response to a subscriber's selection of the second network service by clicking on an appropriate network service in the network options web page 172 retrieved and displayed at host computer 110-1, the document server 170 detecting the selection, in turn, generates signal 192 to configuration server 160 to update an entry of map 162 tracking an identity of the host computer 110-1 and a corresponding network service that the host computer 110-1 is assigned-to access the network 150.

To facilitate reassignment of a new network address (such that the host computer 110-1 may access the network 150 via the second network service such as NS #2), the configuration server 160 sends a command 194 to terminate a link 120-1 (e.g., to deny the subscriber and host computer 110-1 access to the network 150) through which the host computer 110-1 previously accessed the network 150 via the first network service NS #1. The host computer 110-1 detects termination of the link 120-1 and, again, executes a routine to request and retrieve an IP address from the configuration server 160. The routine enables the host computer 110-1 to be reassigned a new IP address (e.g., address E) to access the network 150 via the second network service NS #2. Because the host computer 110-1 is programmed to automatically perform the request for an IP address when the initial link 120-1 is terminated, the subscriber need not perform any manual operations to initiate reassignment of a new IP address. Instead, the host computer 110-1 automatically initiates communication with the configuration server 160 in response to detecting a termination, disablement, or lack of communications on link 120-1 previously used to access network 150 via NS #1. Since the configuration server 160 includes an updated map 162 associating the host computer 110-1 to the second network service NS #2, the configuration server 160 sends the host computer 110-1 an IP address that enables access to the network 150 via the second network service NS #2 instead of the first network service NS #1. In this manner, a subscriber at the host computer 110-1 is automatically reassigned a new IP address (e.g., network address E) for accessing servers and the like over network 150.

Figure 4:
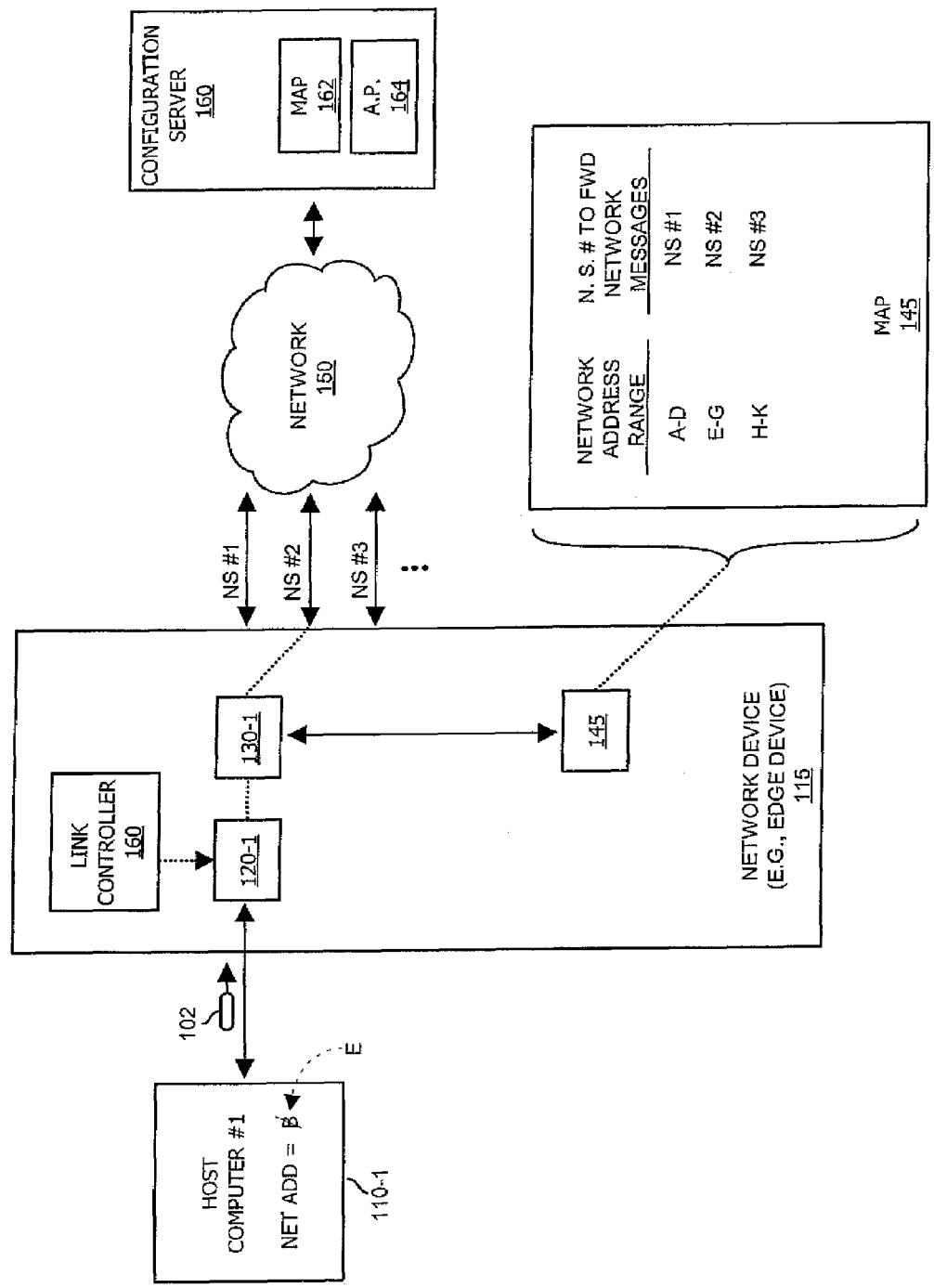
FIG. 4 is a detailed block diagram of a network device and corresponding map to forward messages according to an embodiment of the invention.

FIG. 4 is a more detailed block diagram of network device 115 according to an embodiment of the invention. As shown, host computer 110-1 is initially assigned network address B to communicate through network device 115 via NS #1. Map 145 includes a listing of network address ranges and corresponding network services on which to forward messages to network 150. For example, when host computer 110-1 is initially assigned network address B, message forwarding module utilizes map 145 to determine that messages 102 having a network address B are to be forwarded to network 150 via NS #1. When host computer 110-1 is assigned new network address E, message forwarding module 130-1 forwards messages 102 to network 150 via NS #2 based on use of map 145.

Figure 5:
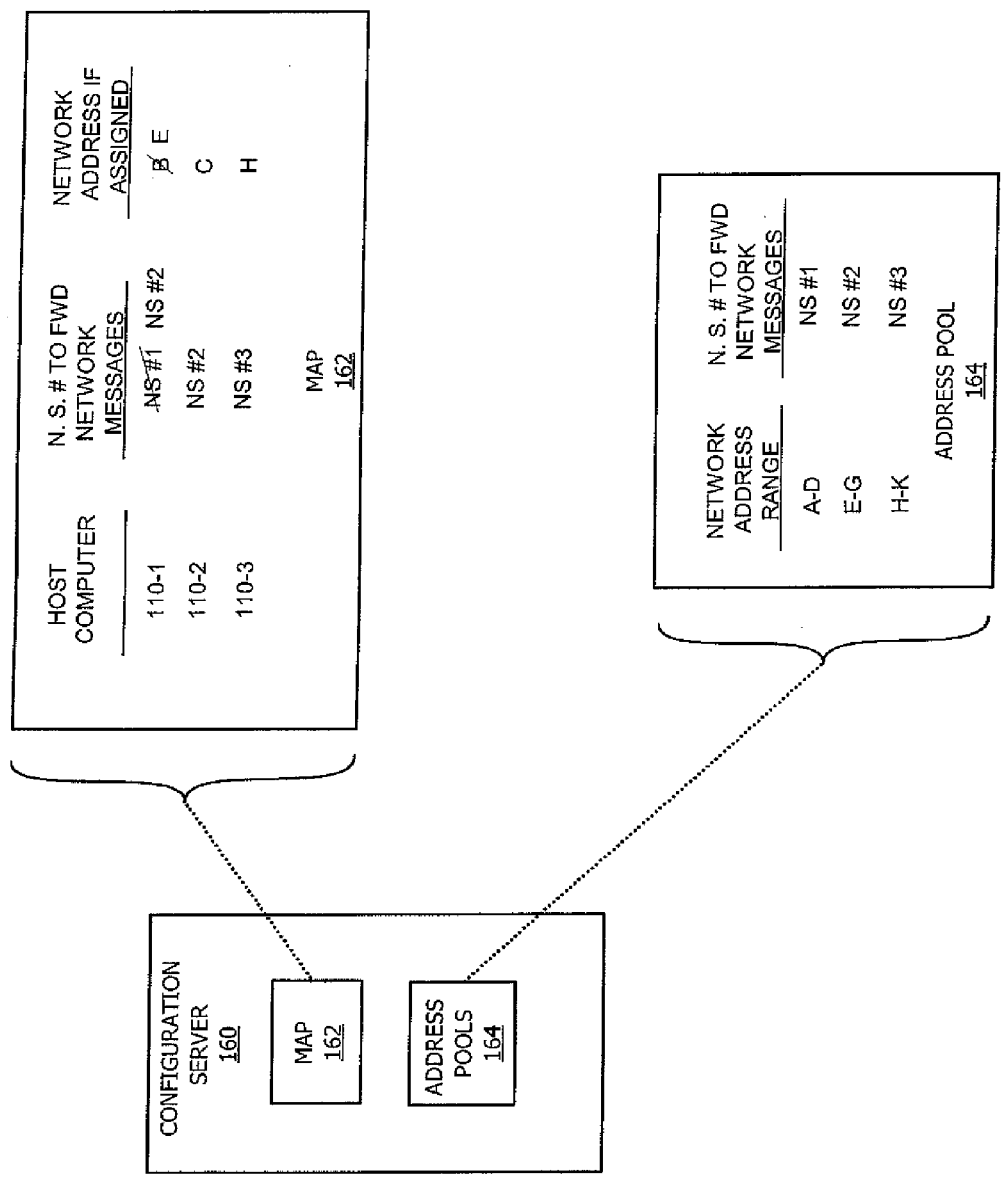
FIG. 5 is a detailed block diagram of a configuration server that maintains and provides configuration information according to an embodiment of the invention.

FIG. 5 more particularly illustrates configuration server 160 according to an embodiment of the invention. As shown, map 162 includes a listing of host computers 110 and corresponding types of network services (e.g., NS #1, NS #2, NS #3, . . . ) upon which messages shall be forwarded to network 150. Address pool 164 includes a range of network addresses and associated network services that, if presently unassigned for use by a host computer 110, may be assigned to a host computer 110 to communicate through network device 115 and access network 150. As discussed, map 145 includes a similar listing to identify on which network service to forward messages to network 150. Thus, when a host computer 110 requests assignment of a network address, configuration server 160 checks map 162 to identify a network service associated with the host computer 110 and thereafter assigns an available (e.g., unused) network address from address pool 164 for use by the host computer 110 to access network 150.

In the present example, configuration server 160 initially assigns host computer 110-1 network address B to access network 150 via corresponding assigned network service #1. As discussed, configuration server 160 receives a signal 192 from document server 170 to change the provided service to NS #2. In response, configuration server 160 modifies map 162 to produce an updated mapping and associate host computer 110-1 to NS #2. Upon request of a new network address to access network 150, configuration server 160 assigns host computer 110-1 network address E such that future communications to network 150 shall be supported by NS #2 instead of NS #1.

Figure 6:
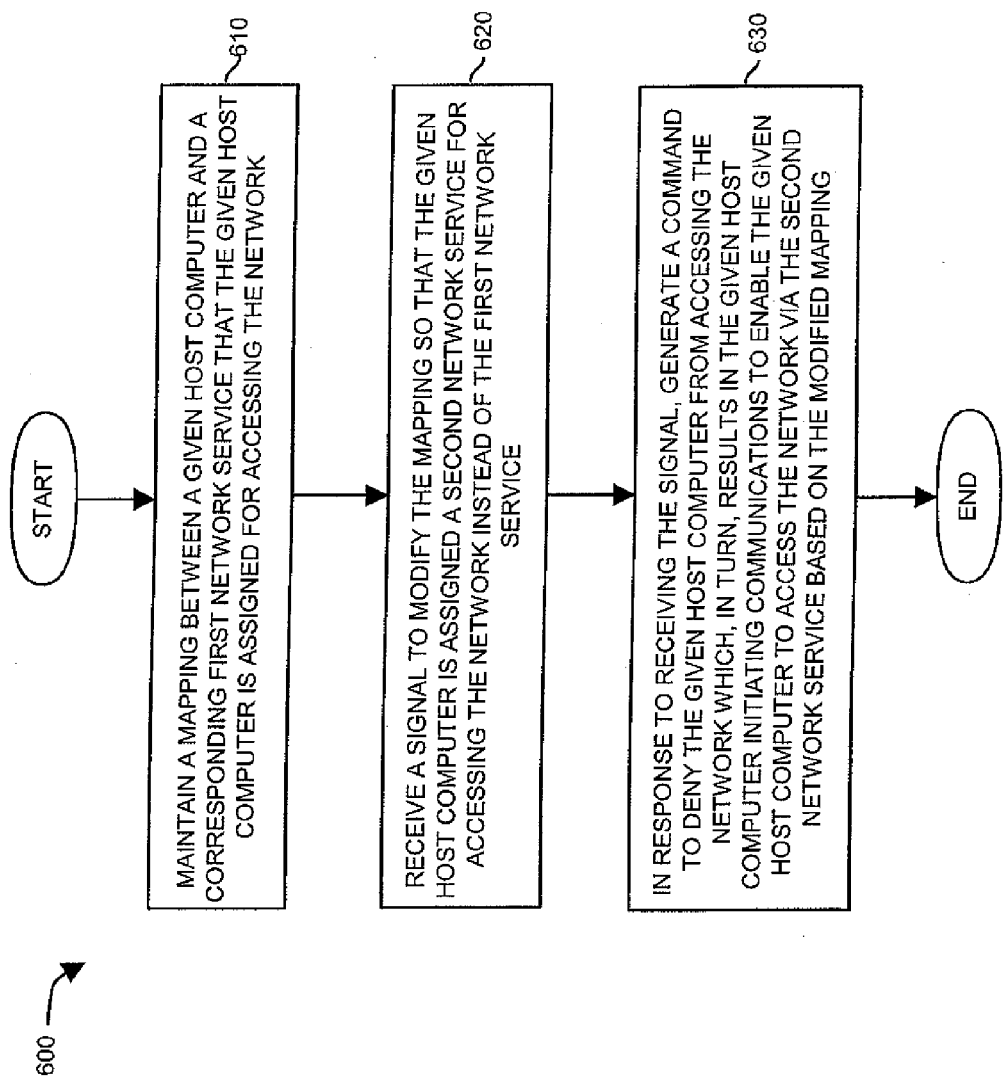
FIG. 6 is a flowchart illustrating a method of supporting reconfiguration of a host computer according to an embodiment of the invention.

FIG. 6 is a flowchart 600 illustrating a method of supporting reconfiguration of a host computer 110-1 according to an embodiment of the invention. Flowchart 600 is well-suited for execution as a software program on configuration server 160 but may implemented in other applications and modes as well.

In step 610, configuration server 160 maintains a mapping between a given host computer 110-1 (e.g., a client) and a corresponding first network service, NS #1, that the given host computer 110-1 is assigned for accessing the network 150.

In step 620, the configuration server 160 receives a signal 192 to modify the map 162 so that the given host computer 110-1 is assigned a second network service, NS #2, for accessing the network 150 instead of the first network service, NS #1.

In step 630, in response to receiving the signal 192, the configuration server 160 generates a command 194 to deny the given host computer 110-1 from accessing the network 150 which, in turn, results in the given host computer 110-1 initiating communications to enable the given host computer 110-1 to access the network 150 via the second network service NS #2 based on the modified map 162. Thus, the given host computer 110-1 may be automatically reconfigured (e.g., in response to the link 120-1 termination) without having to endure non-use of the host computer 110-1 while it is powering down/up again (to be reassigned a new IP address) or requiring a user of the given host computer 110-1 to figure out how to execute an appropriate software command (e.g., a CLI command) to reconnect or reestablish a software link with host computer 110-1 to the network 150.

In further embodiments and yet other independent embodiments of the invention, generating the command 194 to deny host computer 110-1 from accessing the network 150 includes providing the command 194 (via configuration server 160) to at least temporarily disconnect a physical link or terminate an electronic signal (e.g., a carrier signal, an acknowledgment signal, a reply signal, etc.) otherwise transmitted between host computer 110-1 and network device 115 to maintain the communication link 120-1 supporting communications (e.g., messages 102) from the given host computer 110-1 to the first network service, NS #1. Termination of link 120-1 or failure to forward network messages in general denies host computer 110-1 access to network 150. Denial of network access prompts host computer 110-1 to initiate a routine to re-establish a communication link 120-1 to access the network 150 via the second network service NS #2 according to modified map 162 now indicating that host computer 110-1 shall hereinafter access network 150 via NS #2.

In one embodiment, host computer 110-1 initially communicates over the network 150 via the first network service NS #1 via use of a first network address and denial of network access (or terminating the link) prompts the given computer to be reassigned a second network address to access the network 150 via a second network service. Thus, prior to modifying map 162, the configuration server 160 disseminates a first network address to the given host computer 110-1 to support access to the network 150 via the first network service. After modifying the map 162, the configuration server 160 disseminates a second network address to the given host computer 110-1 to support access to the network 150 via the second network service. In one embodiment, denial of network access prompts the given host computer 110-1 to request reassignment of a network address for use by the given host computer 110-1 to access network 150. As discussed above, configuration server 160 may provide the second network address.

In one embodiment, reception of signal 192 at configuration server 160 to modify map 162 includes receiving a selection message identifying that a subscriber at the given host computer 110-1 selects a second network service on which to support future communications instead of the first network service. For example, a subscriber at the given host computer 110-1 may select the second network service based on accessing a web page (e.g., NS options page 172) including network service options from a document server 170 via use of the first network service.

Selection of the one of multiple available network services via the NS options page 172 prompts the document server 170 to transmit a signal 192 to the configuration server 160 to modify the map 162 to associate the given host computer 110-1 with the second network service instead of the first network service. In response, the configuration server 160 updates map 162 associating host computer 110-1 to corresponding selected network services on which to access the network 150. In the present example, the subscriber at the given host computer 110-1 selects the second network service NS #2 for accessing the network 150.

After the configuration server 160 updates the map 162, there is an instant in time in which the given host computer may be accessing the network 150 via the first network service (prior to expiration of the present lease associated with network address B) even though a subscriber at host computer 110-1 has just selected a second network service on which to access the network 150. To support a switchover to the second network service, the configuration server 160 transmits command 194 to deny network access to host computer 110-1 by transmitting a command 194 to network device 115 disposed between the host computer 110-1 and the network 150 being accessed. The network device 115 may include a link 120-1 to the given host computer 110-1 that is established according to a connection-oriented protocol such as TCP/IP. For example, the given host computer 110-1 may be coupled to the network 150 via a network device 115 based on a TCP/IP (Transmission Control Protocol/Internet Protocol) protocol linking the given host computer 110-1 to the first network service NS #1. Upon receipt of the command 194 at the network device 115 to terminate network access, the network device 115 terminates communication on link 120-1 such that the given host computer no longer detects that it is coupled to the network device. In one embodiment, the network device terminates the link 120-1 at a link layer (e.g., layer 2) of the connection-oriented protocol (e.g., TCP/IP) in response to receiving the command 194.

In response to detecting termination of the communication link 120-1, the given host computer 110-1 initiates a routine to re-establish a link with the network device 115 to access the network 150 via the second network service according to the modified map 162 using a new network address. For example, the routine to re-establish a link may involve the given computer generating a DHCP request message to obtain another valid IP address with which to communicate over the network 150 via an appropriate network service. In the present example, the configuration server 160 will reassign the given host computer 110-1 an IP address enabling access to the network 150 via the second network service instead of the first network service.

According to conventional techniques as discussed in the background above, the DHCP specification in RFC 2131 and RFC 2132 do not provide for any mechanism through which a configuration server can cause a DHCP client to be assigned a new address prior to the expiration of an existing network address lease. In RFC 3203, "DHCP reconfigure extension" describes a message that a server may send to a client to force the client to renew the lease on its address immediately. However, as mentioned, RFC 3203 is not known to be implemented in any DHCP clients because of potential security problems.

There are certain situations when it is desirable that a configuration server such as configuration server 160 n FIG. 1 has the ability to initiate a DHCP message exchange through which host computer 110-1 is assigned a new IP address before expiration of the lease of a network address currently assigned to the host computer 110-1. For example, in one embodiment, via configuration server 160, a Managed Service Provider (MSP) may assign use of a network address (e.g., network address B) to host computer 110-1 from an address pool including available network addresses provided by ISPs (Internet Service Providers) carried by the MSP. If a host computer 110-1 selects a new ISP on which to access network 150 via selection of NS #2 in lieu of NS #1, the host computer 110-1 is preferably assigned a new network address (e.g., network address E) prior to the expiration of the leased network address B from the previous ISP.

In a specific embodiment, the invention addresses the problem of controlling host computer 110-1 such as a DHCP client through the use of the L2 interface to the host computer 110-1. When network device 115 is notified via command 194 to tear down link 120-1, network device 115 causes an L2 level disconnect at link 120-1 between network device 115 and host computer 110-1. The L2 connection status indicating disconnection of host computer 110-1 causes host computer 110-1 to, in turn, contact the configuration server 160 prior to T1 as specified by RFC 2131. For example, the CLI commands for a network device manufactured by Cisco, Inc., "shutdown" and "no shutdown" would provide this desired effect for a client connected through an Ethernet port. The host computer 110-1 client interprets this event as a "disconnection from the local network", which causes the host computer 110-1 (e.g., a DHCP client) to execute code to send a DHCPREQUEST message to the configuration server 160. The configuration server 160 responds with a DHCPNAK message, indicating that the host computer's network address B is no longer valid. The host computer 110-1 responds with a DHCP message exchange described in section 3.1 of RFC 2131 to obtain its new network address from the configuration server 160.

As previously discussed, use of the DHCPFORCERENEW message in RFC 3203 to reconfigure a host computer with a new network address is not widely implemented because it has potential security issues. In addition to potential security issues, there is no easy way to retrofit processing of the DHCPFORCERENEW message into existing clients without deployment of a new operating system code from a vendor such as Microsoft. Thus, one benefit of implementing the above technique to reassign a new network address prior to expiration of a current lease is that such an implementation does not require any change on the part of existing software such as an operating system deployed by host computers 110 (e.g., DHCP clients). More specifically, according to one embodiment of the invention, disconnection of the host computer 110-1 from the network device 115 and network 150 causes the host computer 110-1 to contact the server from INIT-REBOOT state prior to expiration of the current lease (more precisely, prior to time T1, when the client would normally try to contact the DHCP server to extend its current lease).

Figure 7:
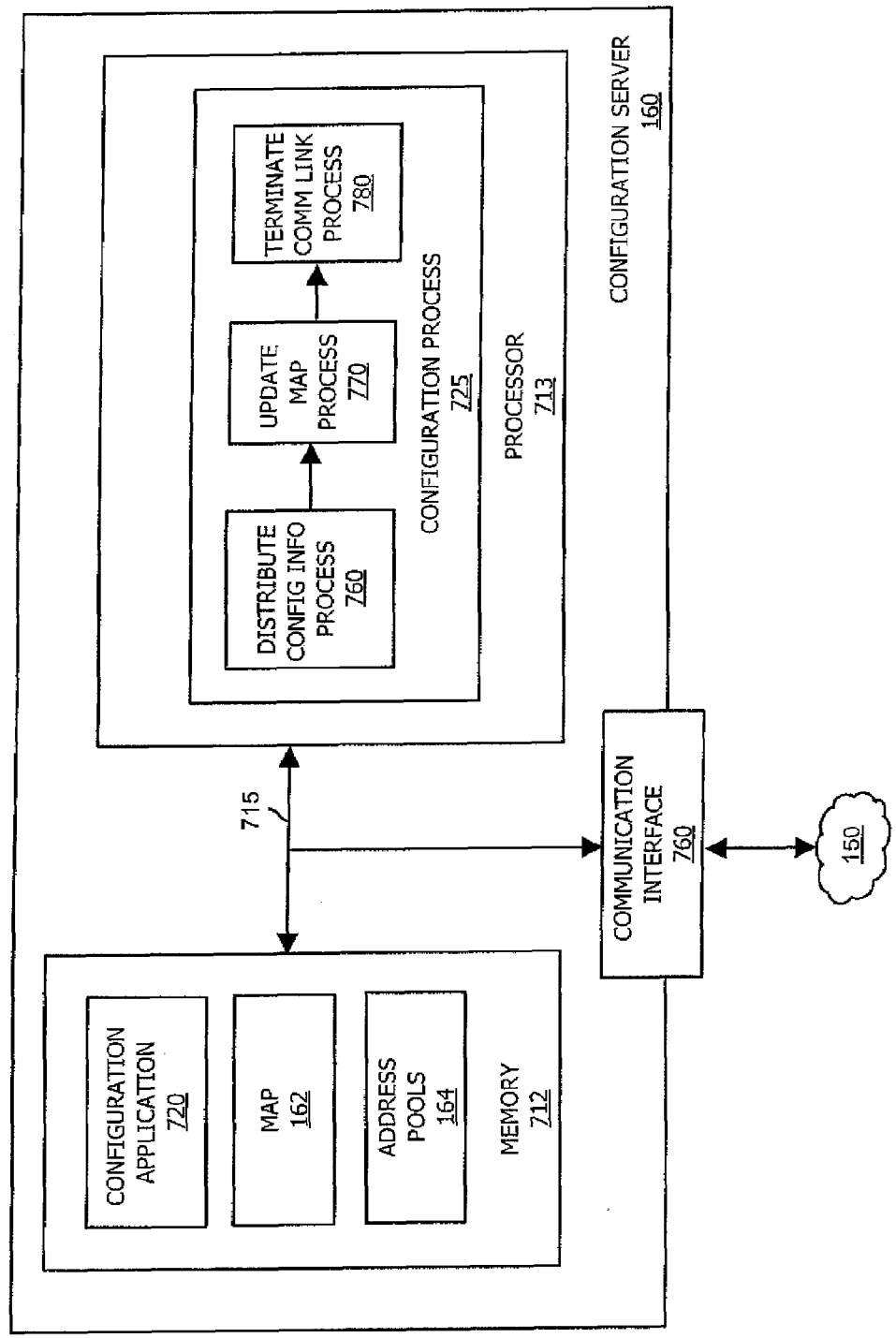
FIG. 7 is a block diagram of a suitable device for executing the flowchart in FIG. 6 according to an embodiment of the invention.

FIG. 7 is a block diagram of a hardware platform suitable for executing flowchart 600 in FIG. 6 (such a computer program) according to an embodiment of the invention. According to one arrangement, configuration sever 160 is a computerized device including interconnect 715 such as a data bus or other circuitry interconnecting memory 712, processor 713, and communication interface 760. Processor 713 may be any type of central processing unit, microprocessor, processing device, controller of other electronic circuitry capable of accessing configuration application 720 to execute, run, interpret, or otherwise operate configuration application 720 to process, forward, and satisfy requests for network addresses from host computers 110 according to embodiments of the invention as explained herein. In other words, configuration application 720, may be embodied as one or multiple software programs that enable configuration server 160 (and similar types of devices) to satisfy requests for requests for network addresses and generate commands to deny access to network 150 as discussed.

Memory 712 stores configuration application 720, as well as map 162 and address pool 164. In general, configuration application 720 in memory 712 represents software code, data and/or logic instructions executed by processor 713. When such code is executed, processor 713 creates distribute configuration information process 760, update map process 770, and terminate communication link process 780.

In another arrangement, configuration server 160 includes a set of specially programmed integrated circuits (ICs) (e.g., Field-Programmable Gate Arrays, Application Specific ICs, etc.) to implement flowchart 600 and related functions. In yet another arrangement, configuration server 160 includes a combination of programmable ICs and processor 713 to support the techniques of the present invention.

Figure 8:
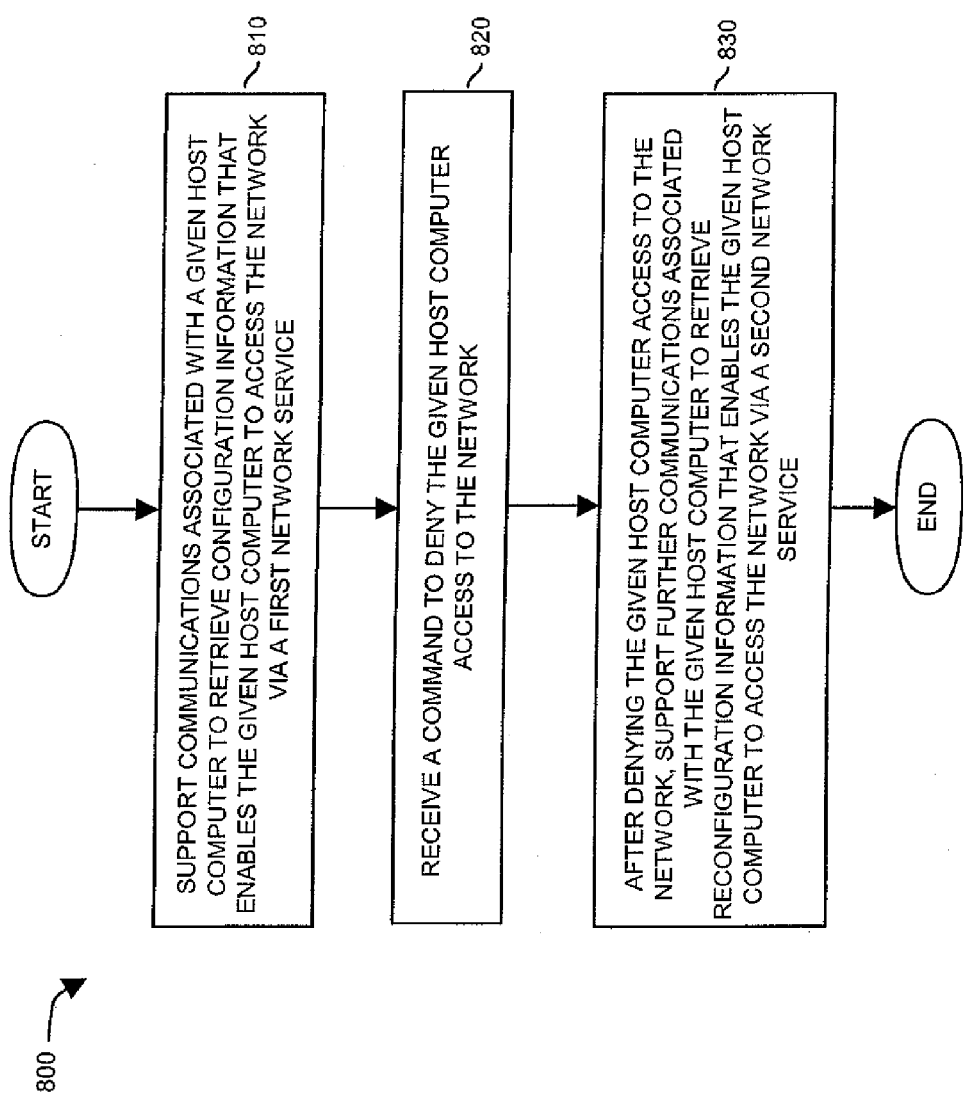
FIG. 8 is a flowchart illustrating a method of supporting reconfiguration of a host computer according to an embodiment of the invention.

FIG. 8 is a flowchart 800 illustrating a method of supporting reconfiguration of host computers 110 according to an embodiment of the invention. Flowchart 800 is well-suited for execution as a software program on network device 115 but may implemented in other applications and modes as well.

In step 810, network device 115 (e.g., a network edge device that supports coupling one or more computers to a network via appropriate network services) supports communications from host computer 110-1 to the configuration server 160 in order to retrieve configuration information such as an IP address that, in turn, enables the given host computer 110-1 to access the network 150 via a first network service NS #1.

In step 820, network device 115 receives a command 194 to deny the given host computer 110-1 access to the network 150.

In step 830, after denying the given host computer 110-1 access to the network 150, the network device 115 supports further communications associated with the given host computer 110-1 to retrieve reconfiguration information (e.g., a new IP address) that enables the given host computer 110-1 to access the network 150 via a second network service NS #2. In other words, configuration server 160 sends host computer another network address for accessing network 150.

In more specific embodiments as previously discussed, network device 115 maintains a map 145 indicating on which of multiple network services (e.g., NS #1, NS #2, NS #3, . . . ) to forward network messages 102 from host computer 110-1 over the network 150 depending on a network address (initially network address B, thereafter network address E) identifying an origin of the network messages 102. Prior to receiving the command 194 to deny network access, configuration server 160 initially assigns the host computer 110-1 a first network address B and the network device 115 forwards network messages received from the given host computer over corresponding first network service NS #1.

A subscriber at host computer 110-1 may select a different network service (e.g. NS #2, NS #3, . . . ) in which to access network 150. The new network service may be a service provider that provides a different bandwidth or type of service network in general. In response to a new selection (such as NS #2) and updating of map 145, the configuration server 160 sends command 194 to network device 115 to deny host computer 110-1 access to network 150 via network address B. The command 194 may indicate to terminate link 120-1 such that the given host computer 110-1 no longer detects that it is coupled to or able to communicate over network device 115 to network 150. After receiving command 194 at the network device 115 and denying network access, the given host computer 110-1 initiates a routine of re-establishing a new link to access network 150. For example, host computer 110-1 sends a message to configuration server 160 for a new network address on which to access network 150. Configuration server 160 assigns the given host computer 110-1 a second network address (e.g., network address E). Based on the new network address E, the network device 115 forwards network messages 102 received from the given host computer 110-1 over a corresponding second network service NS #2.

Figure 9:
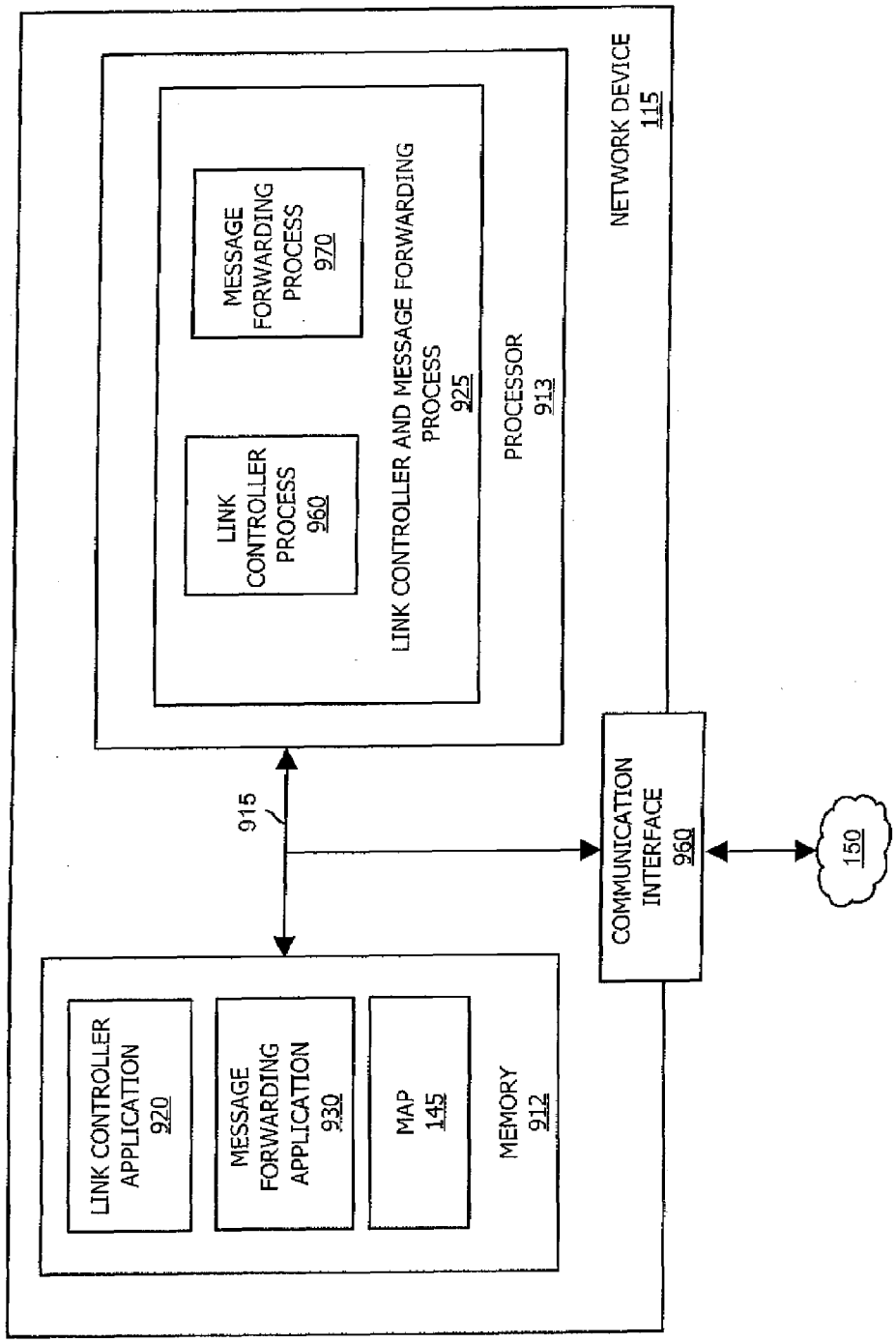
FIG. 9 is a block diagram of a suitable device for executing the flowchart in FIG. 8 according to an embodiment of the invention.

FIG. 9 is a block diagram of a hardware platform suitable for executing flowchart 800 in FIG. 8 (such as a computer program) according to an embodiment of the invention. According to one arrangement, network device 115 is a computerized device including interconnect 915 such as a data bus or other circuitry interconnecting memory 912, processor 913, and communication interface 960. Processor 913 may be any type of central processing unit, microprocessor, processing device, controller of other electronic circuitry capable of accessing link controller application 920 and message forwarding application 930 to execute, run, interpret, or otherwise operate link controller application 920 and message forwarding application 930 to process and forward messages and control links 120 according to embodiments of the invention as explained herein. In other words, link controllerr application 920 and message forwarding application 930 may be embodied as one or multiple software programs that enable network device 115 (and similar types of devices) to forward messages 102 and deny access to network 150 as discussed.

Memory 912 stores link controller application 920, as well as message forwarding application 930 and map 145 and address pool 164. In general, link controller application 920 and message forwarding application 930 in memory 912 represents software code, data and/or logic instructions executed by processor 913. When such code is executed, processor 913 creates link controller and message forwarding process 925, including link controller process 960 and message forwarding process 970.

In another arrangement, network device 115 implements flowchart 800 and related functions via a set of specially programmed integrated circuits (ICs) (e.g., Field-Programmable Gate Arrays, Application Specific ICs, etc.). In yet another arrangement, network device 115 includes a combination of programmable ICs and processor 913 to support the techniques of the present invention.

Embodiments of the invention may be employed such that a communication system 100 and portions thereof support a unique method of configuring host computers 110 to communicate over network 150. Use of the aforementioned techniques are particularly well-suited for use in network systems that supports disseminating configuration information to a given host computer 110-1 according to DHCP (Dynamic Host Control Protocol) and, more specifically, those that support disseminating network addresses (e.g., IP addresses) for use by host computers 110 that access a network 150 via one of multiple network services (e.g., NS #1, NS #2, NS #3, . . . ) as indicated by map 162 in configuration server 160.

The above embodiments (i.e., communication system 100 as shown in FIG. 1) describe how to control connectivity of host computers 110 to network 150 based on manipulating network connections (e.g., links 120) at network device 115 through which one or more corresponding host computers 110 connect to network 150. In certain circumstances, another device such as an intermediate device (e.g., a hub) may be disposed between the network device 115 and corresponding one or more host computers 110. In this instance, the technique of denying network access to a particular host computer 110-1 is different than the embodiments as discussed above. For example, the technique in this latter embodiment involves sending command 194 to network device 115 to terminate a corresponding link 120 so that the intermediate device is no longer in communication with network 150 through network device 115. When the intermediate device detects that its upstream interface (e.g., link 120-1 in network device 115) has been disabled, the intermediate device disables its downstream interfaces (e.g., a link to corresponding host computer 110-1) to deny the host computers 110-1 access to network 150. Similar in some respects to the techniques discussed above, denial of network access by the intermediate device in this way prompts the host computer 110-1 to initiate reassignment of a new network address. Thus, the intermediate device such as a hub may deny network access instead of the network device 115, prompting a corresponding host computer 110 to request a new IP address.

In yet another embodiment, the DHCPFORCERENEW command may be used to force a host computer 110 to initiate being reassigned a new network address even though the host computer does not formally support such a command as discussed above. In this embodiment, configuration server 160 generates a DHCPFORCERENEW message to, for example, host computer 110-1. Instead of the message being received at the target host computer 110-1 that does not formally support the command, network device 115 intercepts the DHCPFORCERENEW message and, in response, terminates a corresponding link 120-1 associated with the message to deny access to network 150. As discussed above, denial of network access by the intercepting node (e.g., network device 115) prompts host computer 110-1 to initiate use of the DHCP protocol to be reassigned a new network address.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method to support reconfiguration of a host computer that is utilized to access a network, the method comprising:
   maintaining a mapping between a given host computer and a corresponding first network service that the given host computer is assigned for accessing the network;
   receiving a signal to modify the mapping so that the given host computer is assigned a second network service for accessing the network instead of the first network service; and
   in response to receiving the signal, generating a command to deny the given host computer from accessing the network which, in turn, results in the given host computer initiating communications to enable the given host computer to access the network via the second network service based on a modified mapping.

2. A method as in claim 1, wherein generating the command to deny the given host computer from accessing the network includes:
   providing the command to temporarily disconnect a physical link supporting communications from the given host computer to the first network service to deny the given host computer access to the network, denial of access prompting the given host computer to initiate a routine to re-establish a communication link to access the network via the second network service according to the modified mapping.

3. A method as in claim 1, wherein generating the command to deny the given host computer from accessing the network includes:
   providing the command to temporarily terminate an electronic signal otherwise transmitted on a communication link to the given host computer to maintain a connection between the given host computer and the first network service, termination of the electronic signal causing the given host computer to initiate a routine to re-establish a link to access the network via the second network service according to the modified mapping.

4. A method as in claim 1, wherein generating the command to deny the given host computer from accessing the network includes:
   providing the command to temporarily terminate a carrier frequency otherwise transmitted on a wireless communication link to the given host computer to maintain a wireless connection between the given host computer and the first network service, termination of the carrier frequency causing the given host computer to initiate a routine to re-establish a link to access the network via the second network service according to the modified mapping.

5. A method as in claim 1 further comprising:
   prior to modifying the mapping in response to receiving the signal, disseminating a first network address to the given host computer to support access to the network via the first network service; and
   after modifying the mapping in response to receiving the signal, disseminating a second network address to the given host computer to support access to the network via the second network service.

6. A method as in claim 5, wherein disseminating the second network address includes:
   providing the second network address in response to the given host computer requesting a network address for use by the given host computer to access to the network.

7. A method as in claim 1, wherein receiving the signal includes receiving a selection message identifying that a subscriber at the given host computer selects the second network service on which to support future communications associated with the given host computer based on the subscriber at the given host computer selecting the second network service from a website accessed via the first network service.

8. A method as in claim 7 further comprising:
   in response to receiving the selection message, updating the mapping to include an entry identifying an association between the given host computer and the second network service such that future network access by the given host computer is supported by the second network service.

9. A method as in claim 1, wherein the second network service is selected from one of multiple available network services displayed on a web page which is presented to a subscriber at the given host computer, a selection of one of multiple available network services by the subscriber prompting a web server supporting the web page to transmit the signal to the configuration server to modify the mapping to associate the given host computer with the second network service instead of the first network service.

10. A method as in claim 1, wherein generating the command to deny the host computer access to the network includes:
    transmitting the command to a network device disposed between the given host computer and the network, the network device including a link to the given host computer established according to a connection-oriented protocol, the link initially coupling the given host computer to the first network service based on the mapping.

11. A method as in claim 10, wherein upon receipt of the command at the network device, the network device terminates communication on the link such that the given host computer no longer detects that it is coupled to the network device, the given host computer, in response, initiating a routine to re-establish a link with the network device to access the network via the second network service according to the mapping.

12. A method as in claim 11, wherein the network device terminates the link at a link layer of the connection-oriented protocol in response to receiving the command.

13. A method as in claim 1 further comprising:
disseminating configuration information to the given host computer according to DHCP (Dynamic Host Control Protocol), the configuration information including an IP (Internet Protocol) address for use by the given host computer to access the network via one of multiple network services as indicated by the mapping.

14. A method of supporting access to a network via one of multiple network services, the method comprising:
supporting communications associated with a given host computer to retrieve configuration information that enables the given host computer to access the network via a first network service;
receiving a command to deny the given host computer access to the network; and
after denying the given host computer access to the network, supporting further communications associated with the given host computer to retrieve reconfiguration information that enables the given host computer to access the network via a second network service.

15. A method as in claim 14 further comprising:
in response to receiving the command, disconnecting a physical link supporting communications from the given host computer to the first network service to deny the given host computer access to the network, denial of access prompting the given host computer to initiate a routine to re-establish a communication link to access the network via the second network service.

16. A method as in claim 14 further comprising:
in response to receipt of the command, at least temporarily terminating transmission of information on a modem channel otherwise transmitted on a communication link to the given host computer to maintain a connection between the given host computer and the first network service, termination of the transmission of information on the modem channel causing the given host computer to initiate a routine to re-establish a link to access the network via the second network service.

17. A method as in claim 14 further comprising:
in response to receipt of the command, at least temporarily terminating a carrier frequency otherwise transmitted on a wireless communication link to the given host computer to maintain a wireless connection between the given host computer and the first network service, termination of the carrier frequency causing the given host computer to initiate a routine to re-establish a new wireless link to access the network via the second network service.

18. A method as in claim 14 further comprising:
maintaining a map indicating on which of multiple network services to forward network messages from the given host computer over the network depending on a network address identifying an origin of the network messages;
forwarding network messages received from the given host computer over a first network service when the corresponding network messages include a first network address identifying the given host computer as an originator; and
forwarding network messages received from the given host computer over a second network service when the corresponding network messages include a second network address identifying the given host computer as an originator.

19. A method as in claim 14 further comprising:
prior to receiving the command from the configuration server, maintaining a link coupling the given host computer to the network via the first network service; and
wherein upon receiving the command, communication on the link is terminated such that the given host computer no longer detects that it is coupled to the network device and, in response, the given host computer initiates an INIT-REBOOT routine to establish a new link to access the network via the second network service based on the reconfigure information.

20. A method to support reconfiguration of a host computer used to access a network, the method comprising:
maintaining configuration information associated with a given host computer, the configuration information being maintained at a remote location with respect to the given host computer;
modifying the configuration information associated with the given host computer in response to receiving a signal; and
in response to modifying the configuration information, generating a command to terminate a communication link through which the given host computer communicates to access the network, termination of the communication link prompting the given host computer to initiate further communications to enable the given host computer to again access the network based on use of the modified configuration information.

21. A computer system coupled to a network that supports transmission of data, the computer system including:
a processor;
a memory unit that stores instructions associated with an application executed by the processor;
a communication interface that supports communication with nodes in the network; and
an interconnect coupling the processor, the memory unit, and the communication interface, enabling the computer system to execute the application and perform operations of:
maintaining a mapping between a given host computer and a corresponding first network service that the given host computer is assigned for accessing the network;
receiving a signal to modify the mapping so that the given host computer is assigned a second network service for accessing the network instead of the first network service; and
in response to receiving the signal, generating a command to deny the given host computer from accessing the network which, in turn, results in the given host computer initiating communications to enable the given host computer to access the network via the second network service based on a modified mapping.

22. A computer system as in claim 21, wherein generating the command to deny the given host computer from accessing the network includes:
providing the command to temporarily disconnect a physical link supporting communications from the given host computer to the first network service to deny the given host computer access to the network, denial of access prompting the given host computer to initiate a routine to re-establish a communication link to access the network via the second network service according to the modified mapping.

23. A computer system as in claim 21, wherein generating the command to deny the given host computer from accessing the network includes:
providing the command to temporarily terminate an electronic signal otherwise transmitted on a communication link to the given host computer to maintain a connection between the given host computer and the first network service, termination of the electronic signal causing the given host computer to initiate a routine to re-establish a link to access the network via the second network service according to the modified mapping.

24. A computer system as in claim 21, wherein generating the command to deny the given host computer from accessing the network includes:
providing the command to temporarily terminate a carrier frequency otherwise transmitted on a wireless communication link to the given host computer to maintain a wireless connection between the given host computer and the first network service, termination of the carrier frequency causing the given host computer to initiate a routine to re-establish a link to access the network via the second network service according to the modified mapping.

25. A computer system as in claim 21 that additionally performs operations of:
prior to modifying the mapping in response to receiving the signal, disseminating a first network address to the given host computer to support access to the network via the first network service; and
after modifying the mapping in response to receiving the signal, disseminating a second network address to the given host computer to support access to the network via the second network service.

26. A computer system as in claim 25, wherein disseminating the second network address includes:
providing the second network address in response to the given host computer requesting a network address for use by the given host computer to access to the network.

27. A computer system as in claim 21, wherein the signal includes a selection message identifying that a subscriber at the given host computer selects the second network service on which to support future communications associated with the given host computer based on the subscriber at the given host computer selecting the second network service from a website accessed via the first network service.

28. A computer system as in claim 27 that additionally performs operations of:
in response to receiving the selection message, updating the mapping to include an entry identifying an association between the given host computer and the second network service such that future network access by the given host computer is supported by the second network service.

29. A computer system as in claim 21, wherein the second network service is selected from one of multiple available network services displayed on a web page which is presented to a subscriber at the given host computer, a selection of the one of multiple available network services by the subscriber prompting a web server supporting the web page to transmit the signal to the configuration server to modify the mapping to associate the given host computer with the second network service instead of the first network service.

30. A computer system as in claim 21, wherein generating the command to deny the host computer access to the network includes:
transmitting the command to a network device disposed between the given host computer and the network, the network device including a link to the given host computer established according to a connection-oriented protocol, the link initially coupling the given host computer to the first network service based on the mapping.

31. A computer system as in claim 30, wherein upon receipt of the command at the network device, the network device terminates communication on the link such that the given host computer no longer detects that it is coupled to the network device, the given host computer, in response, initiating a routine to re-establish a link with the network device to access the network via the second network service according to the mapping.

32. A computer system as in claim 31, wherein the network device terminates the link at a link layer of the connection-oriented protocol in response to receiving the command.

33. A computer system as in claim 21 that additionally performs operations of:
disseminating configuration information to the given host computer according to DHCP (Dynamic Host Control Protocol), the configuration information including an IP (Internet Protocol) address for use by the given host computer to access the network via one of multiple network services as indicated by the mapping.

34. A computer system supporting access to a network via one of multiple network services, the computer system including:
a processor;
a memory unit that stores instructions associated with an application executed by the processor;
a communication interface that supports communication with nodes in the network; and
an interconnect coupling the processor, the memory unit, and the communication interface, enabling the computer system to execute the application and perform operations of:
supporting communications associated with a given host computer to retrieve configuration information that enables the given host computer to access the network via a first network service;
receiving a command to deny the given host computer access to the network; and
after denying the given host computer access to the network, supporting further communications associated with the given host computer to retrieve reconfiguration information that enables the given host computer to access the network via a second network service.

35. A computer system as in claim 34 that additionally performs operations of:
in response to receiving the command, disconnecting a physical link supporting communications from the given host computer to the first network service to deny the given host computer access to the network, denial of access prompting the given host computer to initiate a routine to re-establish a communication link to access the network via the second network service.

36. A computer system as in claim 34 that additionally performs operations of:
in response to receipt of the command, at least temporarily terminating an electronic signal otherwise transmitted on a communication link to the given host computer to maintain a connection between the given host computer and the first network service, termination of the electronic signal causing the given host computer to initiate a routine to re-establish a link to access the network via the second network service.

37. A computer system as in claim 34 that additionally performs operations of:

in response to receipt of the command, at least temporarily terminating a carrier frequency otherwise transmitted on a wireless communication link to the given host computer to maintain a wireless connection between the given host computer and the first network service, termination of the carrier frequency causing the given host computer to initiate a routine to re-establish a link to access the network via the second network service.

38. A computer system as in claim 34 that additionally performs operations of:

maintaining a map indicating on which of multiple network services to forward network messages from the given host computer over the network depending on a network address identifying an origin of the network messages;

forwarding network messages received from the given host computer over a first network service when the corresponding network messages include a first network address identifying the given host computer as an originator; and forwarding network messages received from the given host computer over a second network service when the corresponding network messages include a second network address identifying the given host computer as an originator.

39. A computer system as in claim 34 that additionally performs operations of:

prior to receiving the command from the configuration server, maintaining a link coupling the given host computer to the network via the first network service; and wherein upon receiving the command, communication on the link is terminated such that the given host computer no longer detects that it is coupled to the network device and, in response, the given host computer initiates an INIT-REBOOT routine to establish a new link to access the network via the second network service based on the reconfigure information.

40. A computer system coupled to a network that supports transmission of data, the computer system including:

means for maintaining a mapping between a given host computer and a corresponding first network service that the given host computer is assigned for accessing the network;

means for receiving a signal to modify the mapping so that the given host computer is assigned a second network service for accessing the network instead of the first network service; and means for generating a command to deny the given host computer from accessing the network in response to receiving the signal, denial of access resulting in the given host computer initiating communications to enable the given host computer to access the network via the second network service based on a modified mapping.

41. A computer program product including a computer-readable medium having instructions stored thereon for processing data information, such that the instructions, when carried out by a processing device, enable the processing device to perform the steps of:

maintaining configuration information associated with a given host computer, the configuration information being maintained at a remote location with respect to the given host computer;

modifying the configuration information associated with the given host computer in response to receiving a signal; and in response to modifying the configuration information, generating a command to terminate a communication link through which the given host computer communicates to access the network, termination of the communication link prompting the given host computer to initiate further communications to enable the given host computer to again access the network based on use of the modified configuration information.

* * * * *